Patented Sept. 27, 1938

2,131,210

UNITED STATES PATENT OFFICE 2,131,210

ACCELERATOR FOR THE VULCANIZATION OF RUBBER

William Baird and John Stanley Herbert Davies, Blackley, Manchester, England, assignors to Imperial Chemical Industries Limited, a corporation of Great Britain No Drawing. Application June 27, 1934, Serial No. 732,664. In Great Britain July 7, 1933

14 Claims. (Cl. 260—237)

This invention relates to the vulcanization of rubber and particularly to new chemical compounds useful as accelerators for the vulcanization of rubber.

It is well known that derivatives of N-disubstituted dithiocarbamic acids such as secondary amine salts, metallic salts and esters form valuable accelerators for the vulcanization of rubber, and rubber-like substances.

An object of the present invention is to provide new chemical compounds which are useful as accelerators for the vulcanization of rubber. A further object is to provide methods for preparing such new accelerators. A still further object is to provide a method for vulcanizing rubber by the use of accelerators which are new chemical compounds. Other objects are to provide new compositions of matter and to advance the art. Still other objects will appear hereinafter.

The above and other objects may be accomplished in accordance with our invention, which comprises reacting a quaternary ammonium salt with a metallic salt of a dithiocarbamic acid to produce the corresponding quaternary ammonium salt of the dithiocarbamic acid. These salts are new chemical compounds heretofore unknown and are valuable accelerators for the vulcanization of rubber.

The quaternary ammonium salts which are to be reacted with the dithiocarbamic acid may be represented by the formula

wherein A represents a pentavalent nitrogen atom having three valences satisfied by aliphatic radicals or terminal carbon atoms of a trivalent organic radical forming with the nitrogen atom a heterocyclic ring; R represents an aliphatic or aralkyl radical and X represents halogen. These quaternary ammonium salts may be obtained by reacting an alkyl or aralkyl halide with bases such as pyridine, trimethylamine or hexamethylenetetramine.

These quaternary amonium salts are reacted with a metallic salt of a dithiocarbamic acid such as a sodium, potassium and like alkali metal salts, preferably in a medium in which at least one of the reactants is soluble and one of the products of the reaction is insoluble. The resulting salts will have the formula $$A\begin{matrix}Y\\R\end{matrix}$$

wherein A represents a pentavalent nitrogen atom having three valences satisfied by aliphatic radicals or terminal carbon atoms of a trivalent organic radical forming with the nitrogen a heterocyclic ring; R represents an aliphatic or aralkyl radical and Y represents a dithiocarbamic acid radical.

The dithiocarbamic acids which are employed to form the salts of our invention are those derived from secondary amines containing not more than one aromatic group. Preferably the dithiocarbamic acids of my invention are derived from secondary amines which are devoid of aromatic groups.

In order to more clearly illustrate my invention, the preferred modes of carrying the same into effect and the advantageous results to be obtained thereby, the following examples are given in which the parts are by weight.

Example 1

8 parts of benzyltrimethylammonium chloride and 8 parts of sodium diethyldithiocarbamate are dissolved in 50 parts of methylalcohol and refluxed for 45 minutes. The precipitated salt is filtered off and the solvent removed from the filtrate by distillation under reduced pressure. The residue from the distillation is recrystallized from acetone giving benzyltrimethylammonium diethyldithiocarbamate in the form of small colourless plates softening at 127° C. and decomposing at 128° C. This compound may be represented by the formula

Example 2

13.3 parts of the reaction product formed from hexamethylenetetramine and benzylchloride are dissolved in 30 parts of water and mixed with a solution of 8.5 parts of sodium diethyldithiocarbamate in 30 parts of water. The white product, which separates almost immediately, is filtered off and dried. It softens at 141° C. and melts with decomposition at 154-157° C. The product may be represented by the formula

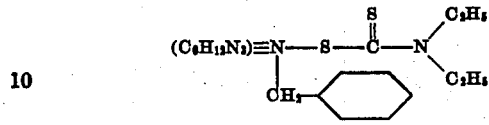

Example 3

7.7 parts of cetylpyridinium bromide and 3.4 parts of sodium diethyldithiocarbamate are heated under reflux for 1 hour with 50 parts of benzene. The reaction mixture is filtered and taken to dryness under reduced pressure giving a brown soft amorphous powder very soluble in water and the common organic solvents. The resulting product may be represented by the formula

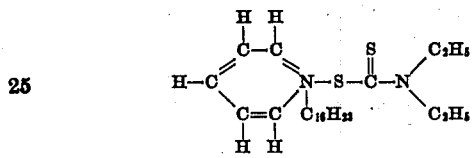

Example 4

The accelerating properties of the products of Examples 2 and 3 were tested in the following mixes:

|  | Example 2 | Example 3 |
|---|---|---|
|  | Parts | Parts |
| Rubber | 100 | 100 |
| Zinc oxide | 10 | 10 |
| Blanc fixe | 75 | 75 |
| Stearic acid | 1 | 1 |
| Sulphur | 2 | 2.5 |
| Accelerator | 0.375 | 0.5 |

The following results were obtained which show both to be very powerful accelerators.

| Time of cure | Temp. of cure | Tensile strength in kg/sq. cm. with product | |
|---|---|---|---|
|  |  | Example 2 | Example 3 |
|  | ° C. |  |  |
| 5 mins | 141 | 227 | 245 |
| 10 mins | 141 | 227 | 247 |
| 10 mins | 110 | 185 | 247 |
| 20 mins | 110 | 216 | 193 |
| 30 mins | 110 | 235 | 216 |
| 40 mins | 110 | 239 | 243 |

The above examples are merely illustrative of our invention. Other compounds falling within our invention are those in which the three valences of the nitrogen atom represented by A are satisfied by methyl, ethyl, propyl, isopropyl, butyl, isobutyl, amyl, vinyl, crotyl, oleyl, lauryl, cyclohexyl, hexadecyl and like radicals. Further, compounds in which A of the formula, given heretofore, represents hexamethylene tetramine, pyridine, picoline, collidine, lutidine, quinoline, isoquinoline and like groups also fall within our invention. It will be understood that when we refer to a pyridine nucleus hereinafter and in the claims, such nucleus will include the picolines, collidines, lutidines, quinolines, and isoquinolines.

Further, R in our formula may represent methyl, ethyl, propyl, isopropyl, butyl, isobutyl, amyl, vinyl, allyl, crotyl, cyclohexyl, hexadecyl, oleyl, lauryl, b-hydroxy ethyl, hydroxy propyl, dihydroxy propyl, benzyl, tolu benzyl, phenyl ethyl, naphthylmethyl, naphthylethyl, diphenylmethyl and like radicals.

Some of the quaternary ammonium salts which are particularly valuable for reacting with metallic salts of dithiocarbamic acids to produce new and valuable chemical compounds are tetramethyl ammonium chloride, hexadecyl trimethyl ammonium chloride, methyl pyridinium chloride, ethyl pyridinium chloride, butyl pyridinium chloride, hexadecyl pyridinium chloride, b-hydroxyethyl pyridinium chloride, 2':3'-dihydroxy-propyl pyridinium chloride, benzyl pyridinium chloride and benzyl isoquinoline chloride.

Some of the other dithiocarbamic acids which are particularly valuable in preparing our new compounds are those derived from secondary amines such as dimethyl amine, ethyl methyl amine, dibutyl amine, dipropyl amine, di-isobutyl amine, di-isoamyl amine, dilauryl amine, dicyclohexyl amine, ethyl cyclohexyl amine, phenyl methyl amine, phenyl ethyl amine, piperidine, morpholine and the like.

From the examples heretofore given, it will be apparent that our new chemical compounds are very effective accelerators for the vulcanization of rubber.

While we have disclosed the preferred embodiments of our invention and indicated some of the variations and modifications that may be made therein, it will be readily apparent to those skilled in the art that many other modifications and variations may be made therein without departing from the spirit of our invention. Accordingly the scope of our invention is to be limited solely by the appended claims construed as broadly as is permissible in view of the prior art.

We claim:

1. A quaternary ammonium salt of diethyldithiocarbamic acid in which one valence of the pentavalent nitrogen atom is satisfied by an aliphatic radical and the other three valences are satisfied by carbon atoms of monovalent aliphatic radicals, said salt being devoid of strongly acidic groups.

2. A quaternary ammonium salt of diethyldithiocarbamic acid in which one valence of the pentavalent nitrogen atom is satisfied by an aralkyl radical in which the aromatic ring is of the benzene series and the other three valences are satisfied by carbon atoms of monovalent aliphatic hydrocarbon radicals, said salt being devoid of strongly acidic groups.

3. Benzyltrimethylammonium diethyldithiocarbamate.

4. The quaternary ammonium salt obtainable from sodium diethyldithiocarbamate and the reaction product formed from hexamethylenetetramine and benzylchloride.

5. Cetylpyridinium diethyldithiocarbamate.

6. A quaternary ammonium salt of a dithiocarbamic acid, the dithiocarbamic acid radical having the formula

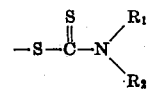

wherein $R_1$ is a hydrocarbon radical and $R_2$ is an aliphatic hydrocarbon radical, one valence of the pentavalent nitrogen atom of the quaternary ammonium radical being satisfied by an aliphatic hydrocarbon radical and the other three valences of said pentavalent nitrogen atom being satisfied by radicals of the group consisting of separate and distinct monovalent aliphatic hydrocarbon radicals and trivalent organic radicals which form with the said nitrogen atom a heterocyclic ring selected from the group of hexamethylene tetramine and pyridine rings which organic radicals consist of carbon, hydrogen and nitrogen.

7. A quaternary ammonium salt of a dithiocarbamic acid, the dithiocarbamic acid radical having the formula

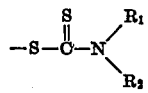

wherein $R_1$ is a hydrocarbon radical and $R_2$ is an aliphatic hydrocarbon radical, one valence of the pentavalent nitrogen atom of the quaternary ammonium radical being satisfied by an aralkyl radical, and the other three valences of said pentavalent nitrogen atom being satisfied by radicals of the group consisting of separate and distinct monovalent aliphatic hydrocarbon radicals and trivalent organic radicals which form with the said nitrogen atom a heterocyclic ring selected from the group of hexamethylene tetramine and pyridine rings which organic radicals consist of carbon, hydrogen and nitrogen.

8. A quaternary ammonium salt of a dithiocarbamic acid, the dithiocarbamic acid radical having the formula

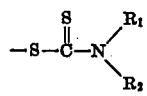

wherein $R_1$ is a hydrocarbon radical and $R_2$ is an aliphatic hydrocarbon radical, one valence of the pentavalent nitrogen atom of the quaternary ammonium radical being satisfied by a benzyl radical, and the other three valences of said pentavalent nitrogen atom being satisfied by radicals of the group consisting of separate and distinct monovalent aliphatic hydrocarbon radicals and trivalent organic radicals which form with the said nitrogen atom a heterocyclic ring selected from the group of hexamethylene tetramine and pyridine rings which organic radicals consist of carbon, hydrogen and nitrogen.

9. A quaternary ammonium salt of a dithiocarbamic acid, the dithiocarbamic acid radical having the formula

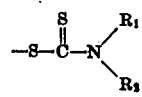

wherein $R_1$ is a hydrocarbon radical and $R_2$ is an aliphatic hydrocarbon radical, one valence of the pentavalent nitrogen atom of the quaternary ammonium radical being satisfied by an aliphatic hydrocarbon radical, and the other three valences of said pentavalent nitrogen atom being satisfied by separate and distinct monovalent aliphatic hydrocarbon radicals.

10. A quaternary ammonium salt of a dithiocarbamic acid, the dithiocarbamic acid radical having the formula

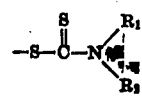

wherein $R_1$ is a hydrocarbon radical and $R_2$ is an aliphatic hydrocarbon radical, one valence of the pentavalent nitrogen atom of the quaternary ammonium radical being satisfied by an aliphatic hydrocarbon radical, and the other three valences of said pentavalent nitrogen atom being satisfied by separate and distinct monovalent methyl radicals.

11. A quaternary ammonium salt of a dithiocarbamic acid, the dithiocarbamic acid radical having the formula

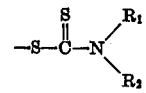

wherein $R_1$ is a hydrocarbon radical and $R_2$ is an aliphatic hydrocarbon radical, one valence of the pentavalent nitrogen atom of the quaternary ammonium radical being satisfied by an aralkyl radical in which the aromatic ring is of the benzene series, and the other three valences of said pentavalent nitrogen atom being satisfied by separate and distinct monovalent aliphatic hydrocarbon radicals.

12. A quaternary ammonium salt of a dithiocarbamic acid, the dithiocarbamic acid radical having the formula

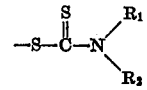

wherein $R_1$ is a hydrocarbon radical and $R_2$ is an aliphatic hydrocarbon radical, one valence of the pentavalent nitrogen atom of the quaternary ammonium radical being satisfied by an unsubstituted benzyl radical, and the other three valences of said pentavalent nitrogen atom being satisfied by separate and distinct monovalent aliphatic hydrocarbon radicals.

13. A quaternary ammonium salt of a dialkyldithiocarbamic acid, one valence of the pentavalent nitrogen atom of the quaternary ammonium radical being satisfied by an aliphatic hydrocarbon radical, and the other three valences of said pentavalent nitrogen atom being satisfied by radicals of the group consisting of separate and distinct monovalent aliphatic hydrocarbon radicals and trivalent organic radicals which form with the said nitrogen atom a heterocyclic ring selected from the group of hexamethylene tetramine and pyridine rings which organic radicals consist of carbon, hydrogen and nitrogen.

14. A quaternary ammonium salt of diethyldithiocarbamic acid, one valence of the pentavalent nitrogen atom of the quaternary ammonium radical being satisfied by an aliphatic hydrocarbon radical and the other three valences of said pentavalent nitrogen atom being satisfied by radicals of the group consisting of separate and distinct monovalent aliphatic hydrocarbon radicals and trivalent organic radicals which form with the said nitrogen atom a heterocyclic ring selected from the group of hexamethylene tetramine and pyridine rings which organic radicals consist of carbon, hydrogen and nitrogen.

WILLIAM BAIRD.
JOHN STANLEY HERBERT DAVIES.